(12) United States Patent
Venter et al.

(10) Patent No.: US 10,487,688 B2
(45) Date of Patent: Nov. 26, 2019

(54) GAS TURBINE ENGINE

(71) Applicants: ROLLS-ROYCE PLC, London (GB); ROLLS-ROYCE DEUTSCHLAND LTD & CO KG, Blankenfelde-Mahlow, Dahlewitz (DE)

(72) Inventors: Gideon Daniel Venter, Dahlewitz (DE); Ivan Popovic, Derby (GB)

(73) Assignees: ROLLS-ROYCE plc, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 402 days.

(21) Appl. No.: 15/187,542

(22) Filed: Jun. 20, 2016

(65) Prior Publication Data
US 2017/0016349 A1 Jan. 19, 2017

(30) Foreign Application Priority Data
Jul. 17, 2015 (GB) .................................. 1512494.4

(51) Int. Cl.
| | | |
|---|---|---|
| F01D 25/16 | (2006.01) | |
| F01D 5/02 | (2006.01) | |
| F01D 15/12 | (2006.01) | |

(52) U.S. Cl.
CPC ........... F01D 25/162 (2013.01); F01D 5/026 (2013.01); F01D 15/12 (2013.01); F01D 25/166 (2013.01); F05D 2220/32 (2013.01); F05D 2240/50 (2013.01); F05D 2260/4031 (2013.01)

(58) Field of Classification Search
CPC ...... F01D 15/12; F01D 25/162; F01D 25/164; F01D 25/166; F01D 5/026; F02C 7/06; F04D 29/057; F04D 29/059; F04D 29/102; F05D 2220/32; F05D 2240/50; F05D 2240/53; F05D 2260/4031
See application file for complete search history.

(56) References Cited

U.S. PATENT DOCUMENTS

| | | | | |
|---|---|---|---|---|
| 3,844,110 A | * | 10/1974 | Widlansky ............ | F01D 25/125 60/39.08 |
| 4,123,666 A | * | 10/1978 | Miller ..................... | F01D 15/10 290/52 |
| 5,450,719 A | * | 9/1995 | Marsh ..................... | F01D 9/065 415/142 |
| 5,915,841 A | * | 6/1999 | Weissert ............... | F16C 17/024 384/104 |
| 5,932,940 A | * | 8/1999 | Epstein .................... | F01D 5/28 310/40 MM |

(Continued)

FOREIGN PATENT DOCUMENTS

| | | |
|---|---|---|
| EP | 1852573 A2 | 11/2007 |
| EP | 2740951 A1 | 6/2014 |

(Continued)

OTHER PUBLICATIONS

Jan. 13, 2016 Great Britain Search Report issued in Patent Application No. GB1512494.4.

(Continued)

Primary Examiner — Jesse S Bogue
(74) Attorney, Agent, or Firm — Oliff PLC

(57) ABSTRACT

A gas turbine engine includes a spool which rotates in use, a static structure and an air bearing, the air bearing being provided at an interface between the spool and the static structure.

18 Claims, 3 Drawing Sheets

(56) References Cited

U.S. PATENT DOCUMENTS

| | | | | |
|---|---|---|---|---|
| 6,286,303 B1* | 9/2001 | Pfligler | F01D 25/125 | 415/110 |
| 7,195,446 B2* | 3/2007 | Seda | F01D 1/24 | 415/229 |
| 7,238,066 B2* | 7/2007 | Taylor | B63H 5/14 | 114/151 |
| 7,251,942 B2* | 8/2007 | Dittmar | B64D 41/00 | 60/39.83 |
| 7,521,815 B2* | 4/2009 | Lee | F01D 25/22 | 290/52 |
| 7,614,792 B2* | 11/2009 | Wade | F16C 17/024 | 384/104 |
| 8,299,670 B2* | 10/2012 | Krumme | A61B 6/035 | 310/90 |
| 8,376,690 B2* | 2/2013 | Saville | F01D 5/026 | 415/124.2 |
| 9,238,973 B2* | 1/2016 | Klusman | F01D 25/16 | |
| 9,404,534 B2* | 8/2016 | Meacham | F01D 25/166 | |
| 9,657,594 B2* | 5/2017 | Klusman | F04D 29/057 | |
| 9,932,857 B2* | 4/2018 | Noel | F01D 25/162 | |
| 10,160,546 B2* | 12/2018 | Beers | F04D 29/057 | |
| 2002/0054718 A1* | 5/2002 | Weissert | F16C 17/024 | 384/104 |
| 2002/0097928 A1* | 7/2002 | Swinton | F01D 25/166 | 384/103 |
| 2004/0161333 A1 | 8/2004 | Klaass et al. | | |
| 2005/0132693 A1* | 6/2005 | Macfarlane | F01D 25/18 | 60/39.08 |
| 2007/0077459 A1 | 4/2007 | Walton et al. | | |
| 2007/0253809 A1* | 11/2007 | Glynn | F01D 11/04 | 415/174.2 |
| 2008/0310953 A1 | 12/2008 | Garrison | | |
| 2009/0263057 A1* | 10/2009 | Kanki | B23H 9/00 | 384/99 |
| 2013/0089409 A1* | 4/2013 | Bedrine | B64C 27/12 | 415/122.1 |
| 2014/0271149 A1 | 9/2014 | Klusman | | |

FOREIGN PATENT DOCUMENTS

| | | |
|---|---|---|
| JP | 2009-057992 A | 3/2009 |
| JP | 2015-151933 A | 8/2015 |
| KR | 101458326 B1 | 11/2014 |

OTHER PUBLICATIONS

Nov. 25, 2016 Extended European Search Report issued in Patent Application No. 16175267.0.

\* cited by examiner

GAS TURBINE ENGINE

The present disclosure concerns gas turbine engines. More specifically the invention concerns gas turbine engines incorporating one or more air bearings. The air bearings may have particular utility when provided at an interface between a core annulus and rotor of the gas turbine engine, but this is not intended to be limiting and air bearings may also be advantageously used elsewhere, for instance in direct support of a shaft of the gas turbine engine.

In the field of gas turbine engines it is known that in order to increase efficiency it is desirable to limit the leakage of core gas into rotor drum cavities and other chambers. Such leakage may be particularly prevalent at an interface between a rotor and the core annulus wall. Poor sealing tends to decrease efficiency because air leaked into the drum cavity does not flow across the rotor blades. Both seals (e.g. labyrinth, brush or leaf) and buffer air is typically therefore used to reduce such leaking. All of the seals mentioned above have limitations in terms of the seal quality they create and some (brush and leaf) tend to require relatively large and heavy assemblies. Consequently higher pressure air is required in the drum cavity or other chamber to create an adequate air buffer for sealing. This air must consequently come from a later compressor stage, which negatively impacts efficiency and worsens the working environment in the drum or other chamber, particularly in terms of increased temperature. Consequently heavier materials, gauges and/or designs may be necessary if service intervals and component life are to be maintained. Furthermore the increased pressure inside the drum or other cavity may increase the axial load that must be reacted by engine location bearings.

As the trend towards ever smaller engine cores, rotating at higher speeds continues, additional demands are placed on rolling element bearings. At the same time the reduction in core size tends to reduce the available space for larger aspect ratio bearings required to contend with the higher speeds.

In the field of gas turbine engines it is also known that spool deformation and deflection can negatively impact on efficiency. Increasing spool constraint may reduce spool deformation and deflection which may be caused by gyroscopic manoeuvre loads, differential thermal conditions, rotor critical speed and rotor bending moments reacted in the shaft. Reducing spool deformation and deflection may increase seal effectiveness and rotor tip clearance consistency with consequent benefits for efficiency.

According to an aspect there is provided a gas turbine engine comprising optionally a spool which rotates in use, optionally a static structure and optionally an air bearing, the air bearing being optionally provided at an interface between the spool and the static structure. The air bearing may provide support and damping to the spool as it rotates. The load carrying capability of the air bearing may increase as the rate of spool rotation increases. This contrasts with traditional rolling element bearings, the load carrying capability of which decrease with increasing rotation rate. In addition to providing support, the air bearing may serve as a seal, limiting air leakage across it. In particular a relatively thin air cushion in the bearing may provide a smaller air leakage path than the equivalent leakage path provided across a rolling element bearing. This may reduce the buffering air requirement and negate the need for use of alternative seals which may be less effective and incur additional weight and/or space penalties. Improvements in sealing offered by the air bearing may increase efficiency of the gas turbine engine and reduce the hostility of the environment downstream of the bearing (e.g. in terms of temperature and pressure) therefore allowing greater design freedom in terms of the materials and their gauges used.

As will be appreciated there may be provided multiple such air bearings as mentioned. For clarity a single air bearing is generally discussed, but this is not intended to be limiting. Thus multiple air bearings may be provided and may conform mutatis mutandis to any embodiment disclosed herein in which a single bearing is implicitly or explicitly disclosed. Further where multiple air bearings are provided, one, some or all may conform to the requirements of any particular embodiment disclosed herein.

In some embodiments the air bearing is a foil bearing. Where the air bearing is hydrodynamic i.e. air flow for the bearing is created by its own rotation, there is no need for provision of an infrastructure to provide pressurised air to the bearing from an external source (as would be necessary with a hydrostatic air bearing). Further as the rate of rotation increases, the load bearing capability of the air bearing will also increase, thereby naturally matching increasing load carrying requirements with increasing rotation rate.

In some embodiments the gas turbine engine comprises one or more rolling element bearings arranged to support a shaft of the spool at an interface between the shaft and the static structure. Additionally the gas turbine engine may comprise one or more air bearings arranged to support the shaft of the spool at an interface between the shaft and the static structure. The shaft may comprise a main shaft and one or more stub shafts, one, some or all of the stub-shafts being provided intermediate the main shaft and one or more of the bearings, be they rolling element or air. The provision of the rolling element bearings may be desirable in order to support the spool where it is static or rotating relatively slowly, as under these conditions the load carrying capability of the air bearing may be limited. Nonetheless the provision of the air bearing may reduce the number and/or size of rolling element bearings required. Further, assuming there is at least one rolling element bearing to support the shaft at low rotation rates, the shaft may additionally be supported by one or more air bearings, effectively replacing rolling element bearings which might otherwise be provided to directly support the shaft. Replacing rolling element bearings with air bearings to the extent possible may be advantageous because the latter may not require oil delivery and scavenge, venting, additional seals and fire prevention provision.

In some embodiments the air bearing is provided radially outward with respect to one, some or all of the rolling element bearings. The greater the radius at which the air bearings are located, the greater their velocity for a given rpm. At greater velocities the load bearing capability of the air bearing may be increased as it entrains air at a greater rate.

In some embodiments the air bearing is located in an air leakage path through which in use air from a core annulus of the gas turbine engine leaks into a cavity radially inward of the core annulus. The air bearing may serve as a seal for the air leakage path, limiting the leakage. A relatively thin air cushion in the bearing may be effective at limiting the leakage across it. By reducing the leakage the air pressure in the cavity may be reduced. Specifically buffer air delivered to the cavity to reduce leakage may be supplied at a lower pressure (e.g. from an earlier compression stage). Such lower pressure buffer air may also be cooler, Reduced pressure and temperature within the cavity may mean that alternative or finer gauge materials can be used therein, potentially increasing design freedom and reducing weight.

Reduced pressure in the cavity may also reduce the axial loads that must be reacted by engine location bearings (the cavity may tend to act as a piston under pressure), potentially allowing for a reduction in their size and/or durability.

In some embodiments the gas turbine engine has a core annulus wall forming part of the static structure and a rotor assembly forming part of the spool, the air bearing being provided at an interface between the core annulus wall and the rotor assembly. In particular an air path providing the bearing by which the rotor assembly is at least partially supported may be at an interface between the core annulus wall and the rotor assembly. Further it may be that the bearing acts on the rotor assembly core annulus wall to support the rotor assembly. The use of air bearings in favour of rolling element bearings may facilitate the locating of a bearing between the core annulus and rotor assembly, a location to which the delivery of oil may be difficult. Located thus the air bearing may provide a seal to limit air leaving the annulus and passing (for instance) into a drum cavity. Further the additional support provided by the air bearing may constrain the spool (particularly with respect to reacting torsional forces) and reduce misalignment and/or bending. The additional support may also reduce the load bearing requirement of other bearings such as rolling element engine location bearings.

In some embodiments the rotor assembly comprises at least one rotor having a disc and the air bearing is provided at an interface between the core annulus wall and a disc rim of the disc. As will be appreciated where the rotor assembly comprises more than one rotor they may be linked to form a drum. Especially in locations such as these, improved radial load carrying capability offered by the provision of an air bearing may improve blade tip clearance consistency and rotor centring relative to the static structure. Air bearings located thus may also support a shaft associated with the rotor assemblies, countering critical speed, gyroscopic or flight manoeuvre effects. Further the location described may be convenient for sealing against excessive leakage of air from the core annulus between it and the rotor assembly.

In some embodiments a first air bearing is provided at an interface between the disc rim in the rotor assembly that is furthest upstream and the core annulus and a second air bearing is provided at an interface between the disc rim in the rotor assembly that is furthest downstream and the core annulus.

In some embodiments the rotor assembly is a compressor. The rotor assembly may for instance be a booster, intermediate pressure or high pressure compressor.

In some embodiments the rotor assembly is a turbine. The rotor assembly may for instance be a low pressure, intermediate pressure or high pressure turbine. High heat resistance and lack of the need for flammable lubricants such as oil may allow air bearings to be installed in relatively hostile locations, for instance those associated with turbines.

In some embodiments a gearbox is provided in the spool drive train. Axial loads reacted by the engine location bearings will tend to be less well mitigated by an upstream rotor in a spool having a gearbox. The potential sealing benefits of the air bearings as previously discussed may therefore have particular benefits with respect to geared architectures.

In some embodiments the gas turbine engine comprises multiple spools. As will be appreciated for one, some or all of the spools an air bearing may be provided at an interface with the static structure as previously described.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
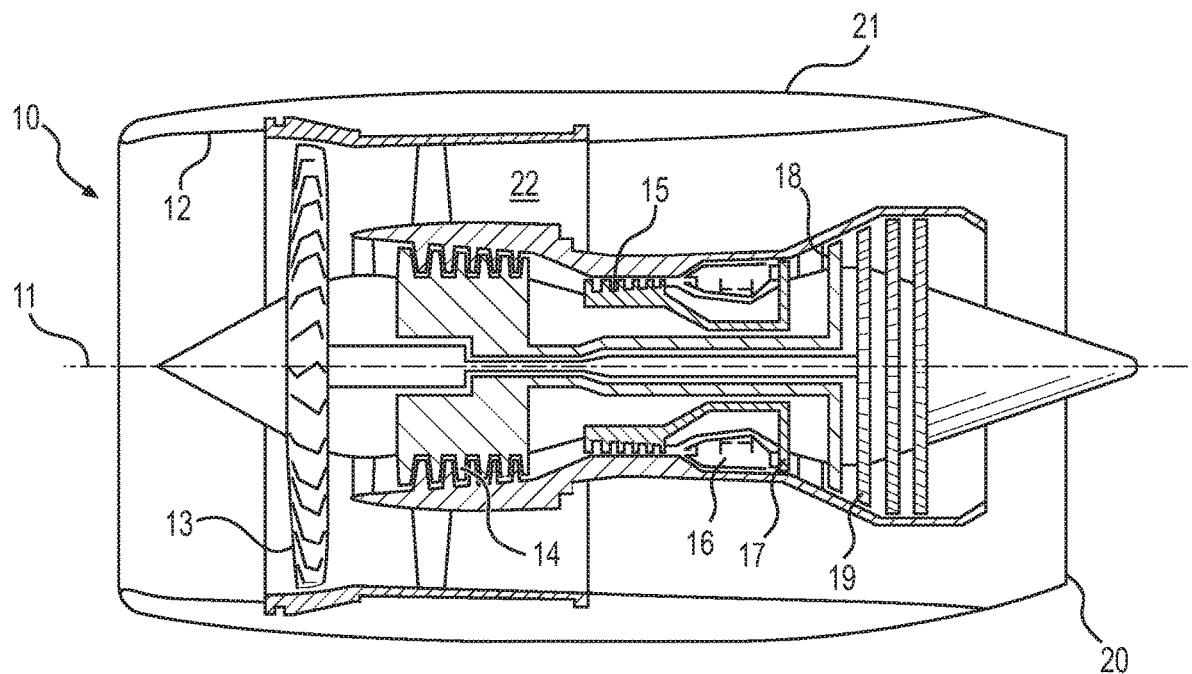
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
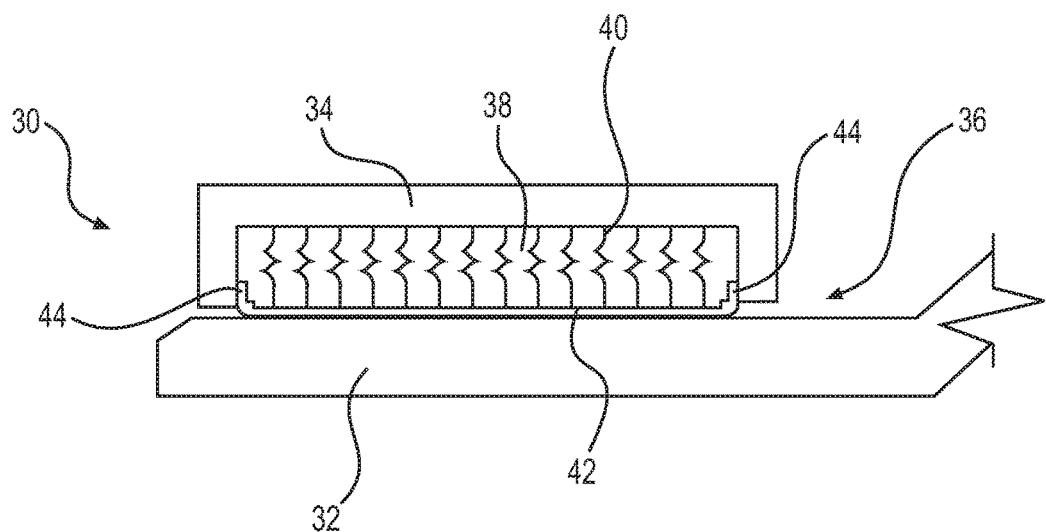
FIG. 2 is a cross-sectional view through an air bearing in accordance with embodiments of the invention.

Referring now to FIG. 2, an air bearing, in this case a foil bearing, is generally shown at 30. The foil bearing 30 comprises a first surface 32 arranged to rotate in use and a second surface 34 that is static in use. The foil bearing 30 is provided at an interface 36 between the two surfaces 32, 34. The second surface 34 is shaped to define a recess 38 containing air 40. A foil layer 42 affixed to the first surface 32 is provided between the first surface 32 and the air 40. The foil layer 42 comprises a pair of rims 44 disposed at opposite axial ends of the foil layer 42 and extending radially away from the first surface to engage the second surface 34. The foil bearing 30 is annular, each of the first 32 and second 34 surfaces being annular at the interface 36 and the foil layer 42 also being annular.

In use rotation of the first surface 32 tends to draw air into the recess 38, passing between the first 32 and second surface 34 and between the second surface 34 and the respective rim 44. As the rotation rate of the first surface 32 increases so the pressure of the air in the recess 38 increases. When rotation of the first surface 32 reaches a sufficient rate, the air pressure in the recess 38 will be sufficient for the first surface 32 and second surface 34 to be forced further apart and for the first surface 32 to ride in its rotation on the cushion of air 40 in the recess 38 supported by the second surface 34. The foil bearing 30 therefore provides support from the second surface 34 to the first surface 32, whilst still allowing the first surface 32 to rotate. Furthermore the cushion of air 40 tends to damp any radial vibrations experienced by the first surface 32. While the foil bearing 30 provides a leakage path for air from one side of the bearing 30 to the other, between the first 32 and second surface 34 via the recess 38, the leakage path is relatively small and so the foil bearing 30 may serve as an effective seal.

Figure 3:
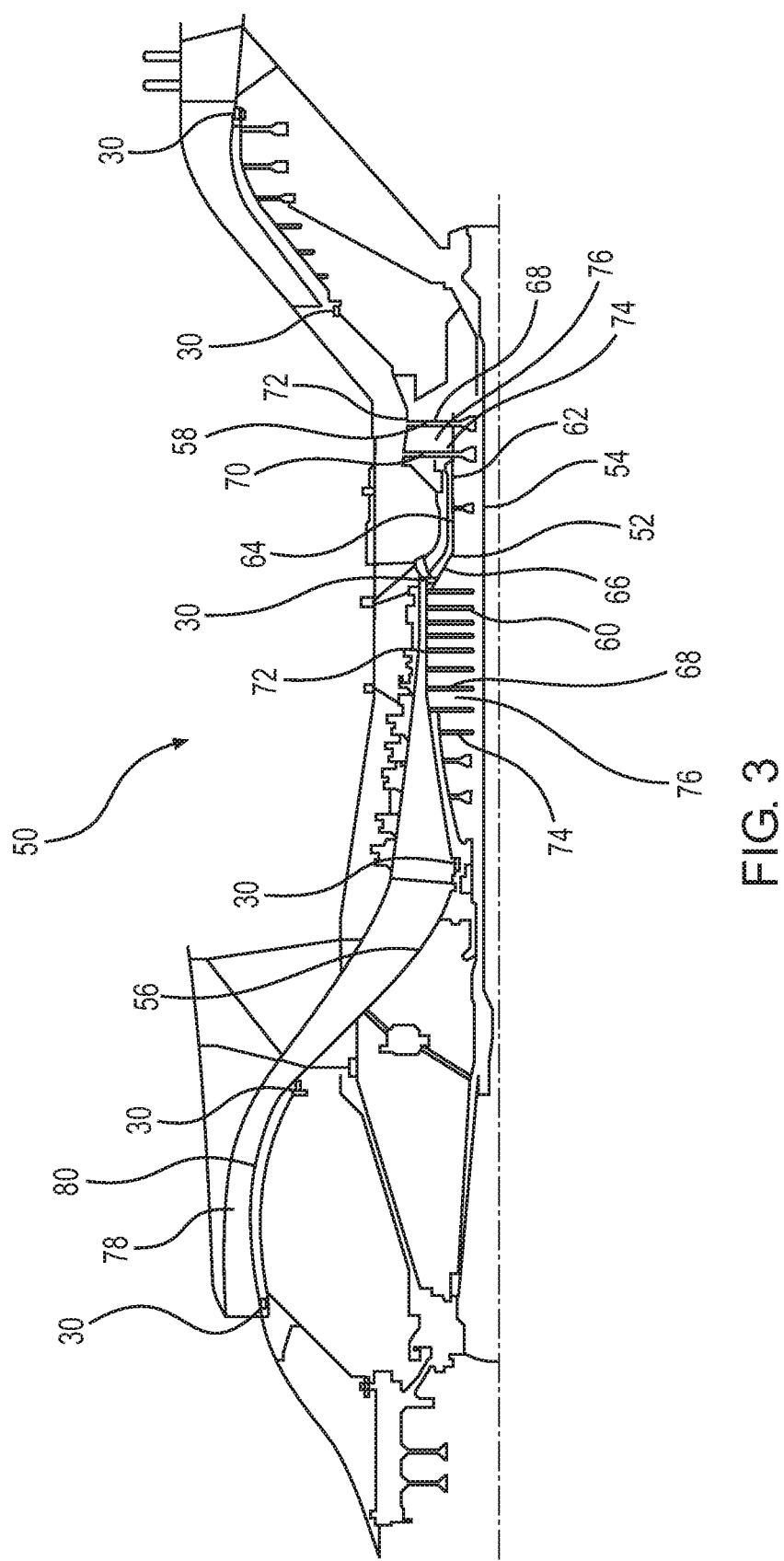
FIG. 3 is a schematic cross-sectional view through a gas turbine engine in accordance with embodiments of the invention.

Turning now to FIG. 3 a gas turbine engine is shown generally at 50. The gas turbine engine comprises two spools, a high pressure spool 52 and a low pressure spool 54. Each spool 52, 54 comprises at least two rotor assemblies interconnected by a shaft. Further at multiple interfaces between each spool 52, 54 and a static structure 56 of the gas turbine engine 50, foil bearings 30 as previously described with reference to FIG. 2 are provided. The static structure 56 of the gas turbine engine comprises multiple directly and indirectly linked components (e.g. nacelle, stators, support struts and core annulus wall) all of which are static with respect to one another.

For simplicity further discussion is limited to the high pressure spool 52 and foil bearings 30 associated therewith. Nonetheless it will be appreciated that a similar explanation is applicable to the low pressure spool 54 and similar foil bearings 30 associated therewith.

The high pressure spool 52 comprises two rotor assemblies, a high pressure turbine 58, and a high pressure compressor 60. The high pressure spool 52 further comprises a shaft 62. The shaft 62 comprises a main shaft 64 and stub shafts (not shown). At an interface (not shown) between each stub shaft and the static structure 56 an engine location bearing, in this case a rolling element bearing (not shown), is provided. The rolling element bearings support the high pressure spool 52 relative to the static structure 56. Connecting the main shaft 64 and the rotor assemblies 58, 60 are a plurality of drive cones 66 (only one shown).

The high pressure compressor 60 comprises a plurality of rotors 68, each comprising a disc 70, a disc rim 72 and an array of blades (not shown). The rotors 68 are interconnected to form a drum 74 having a drum cavity 76 in the area between the furthest upstream and furthest downstream discs 70.

Figure 4:
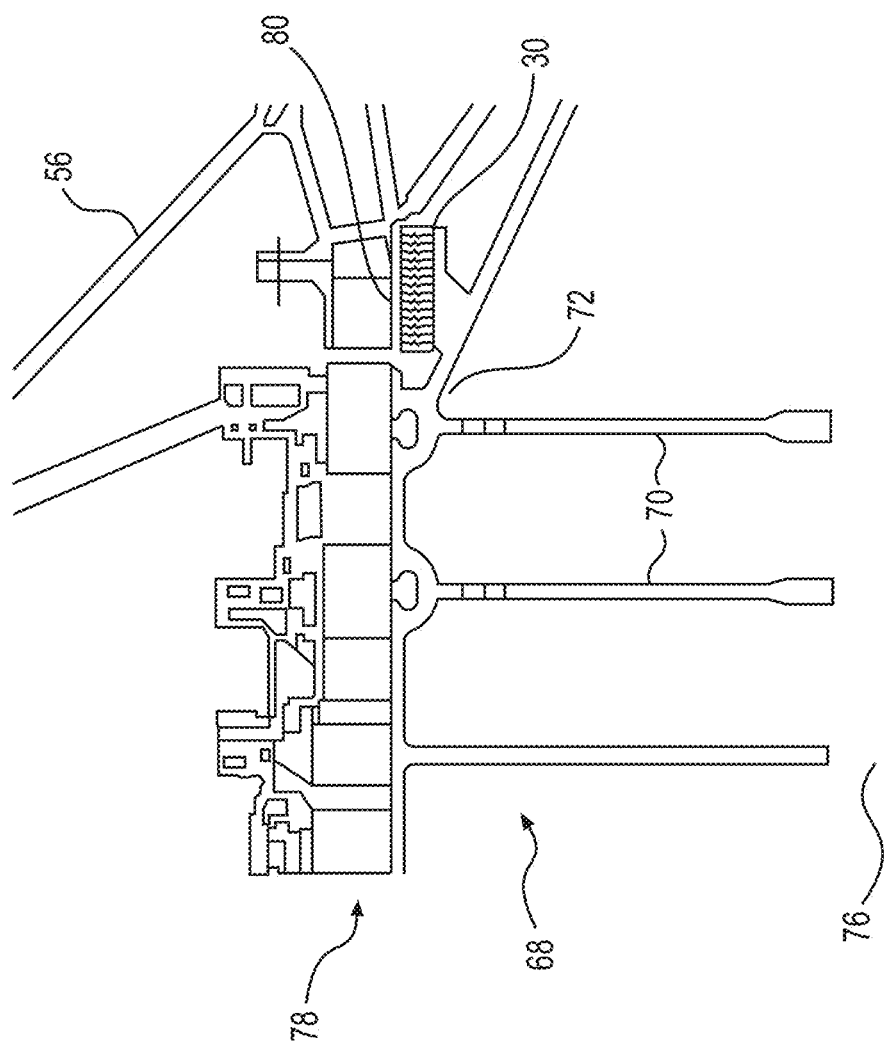
FIG. 4 is an enlarged view of a portion of FIG. 3.

The blades of the high pressure compressor 60 are disposed in a core annulus 78 of the gas turbine engine 50, having a core annulus wall 80 that forms part of the static structure 56. Disposed at interfaces between the core annulus wall 80 and respectively the furthest upstream and furthest downstream disc rims 72 are examples of the foil bearings 30. The foil bearings 30 are provided radially outwards of the rolling element bearings. As shown in FIGS. 3 and 4, for the foil bearings 30 associated with the high pressure spool 52, the first surface 32 is in the form of a lip attached to and rotating with the respective disc rim 72, while the second surface 32 of the foil bearing 30 is formed by a respective portion of the core annulus wall 80. The foil bearing 30 is provided in an air leakage path leading from the core annulus 78 to the drum cavity 76.

In use, the high pressure compressor 60 is driven via the shaft 62 and drive cones 66 by the high pressure turbine 58. The high pressure spool 52 rotates both on the rolling element bearings and on the foil bearings 30, the foil bearings 30 providing additional support and damping to the high pressure spool 52. As the rate of rotation of the high pressure spool 52 increases the load bearing capacity of the foil bearings 30 increases. Consequently at higher rotation rates the proportion of the load share between the rolling element bearings and foil bearings 30 shifts towards the foil bearings 30, reducing the overall load bearing capacity required of the rolling element bearings.

In order to prevent excess leakage of core annulus 78 air across the foil bearings 30 and into the drum cavity 76, the drum cavity 76 is pressurised using bleed air. This buffer air increases the sealing effect of the foil bearing 30 at the interface between the core annulus wall 80 and the respective disc rim 72. Nonetheless the pressurisation of the drum cavity may be maintained at a lower level than might otherwise be required in view of the presence of the foil bearing 30 and specifically the small leakage path across it. The lower pressure buffer air requirement in the drum cavity 76 means that the buffer air may be taken from an earlier compressor stage, such that it is not only at a lower pressure but also at a lower temperature. Lower pressure and lower temperature air in the drum cavity 76 and other chambers radially inward of the core annulus 80, may reduce the hostility of the environment giving greater component design freedom and/or improved service intervals and life expectancy. Further a reduced pressure in these areas may reduce the axial load reacted by the rolling element bearings, potentially allowing them to be smaller and lighter and/or fewer in number.

It will be understood that the invention is not limited to the embodiments above-described and various modifications and improvements can be made without departing from the concepts described herein. By way of example the air bearings need not be provided at the exemplary location discussed. They could for example be provided at an interface between a rotor drive arm and a static structure of the engine. Additionally or alternatively one or more air bearings may be provided to directly support one of the shafts relative to the engine static structure. In this context their use may be particularly appropriate aft of the combustor where the environment is generally more hostile. The incorporation of a gearbox in a drive train of at least one of the spools is also possible. Except where mutually exclusive, any of the features may be employed separately or in combination with any other features and the disclosure extends to and includes all combinations and sub-combinations of one or more features described herein.

The invention claimed is:

1. A gas turbine engine comprising:
   a spool which rotates in use, the spool being a spool of the gas turbine engine;
   a rotor assembly, wherein the rotor assembly is a part of the spool;
   a static structure; and
   an air bearing,
   wherein the static structure comprises a core annulus wall and the air bearing is provided at an interface between the core annulus wall and the rotor assembly, the core annulus wall being a wall of an engine core of the gas turbine engine, the rotor assembly being either a compressor or a turbine,
   wherein the air bearing has a first surface in the form of a lip attached to and rotating with a disc rim of a disc of the rotor assembly, and a second surface formed by a corresponding portion of the core annulus wall, and wherein the rotor assembly forms a drum that includes a drum cavity, the air bearing provided in an air leakage path leading from the core annulus to the drum cavity.

2. A gas turbine engine according to claim 1 wherein the air bearing is a foil bearing.

3. A gas turbine engine according to claim 1 comprising one or more rolling element bearings arranged to support a shaft of the spool at an interface between the shaft and the static structure.

4. A gas turbine engine according to claim 3 wherein the air bearing is provided radially outward with respect to one, some or all of the rolling element bearings.

5. A gas turbine engine according to claim 1 wherein the air bearing is located in an air leakage path through which in use air from a core annulus of the gas turbine engine leaks into a cavity radially inward of the core annulus.

6. A gas turbine engine according to claim 1 wherein the rotor assembly comprises at least one rotor, the at least one rotor having the disc, and the air bearing is provided at an interface between the core annulus wall and the disc rim of the disc.

7. A gas turbine engine according to claim 6 wherein the rotor assembly includes a plurality of disc rims, a first air bearing is provided at a first interface between a disc rim of the plurality of disc rims in the rotor assembly that is furthest upstream and the core annulus and a second air bearing is provided at a second interface between a disc rim of the plurality of disc rims in the rotor assembly that is furthest downstream and the core annulus.

8. A gas turbine engine according to claim 1 wherein the rotor assembly is a compressor.

9. A gas turbine engine according to claim 1 wherein the rotor assembly is a turbine.

10. A gas turbine engine according to claim 1, wherein a gearbox is provided in the spool drive train.

11. A gas turbine engine according to claim 2, wherein a gearbox is provided in the spool drive train.

12. A gas turbine engine according to claim 3, wherein a gearbox is provided in the spool drive train.

13. A gas turbine engine according to claim 4, wherein a gearbox is provided in the spool drive train.

14. A gas turbine engine according to claim 5, wherein a gearbox is provided in the spool drive train.

15. A gas turbine engine according to claim 6, wherein a gearbox is provided in the spool drive train.

16. A gas turbine engine according to claim 7, wherein a gearbox is provided in the spool drive train.

17. A gas turbine engine according to claim 8, wherein a gearbox is provided in the spool drive train.

18. A gas turbine engine according to claim 9, wherein a gearbox is provided in the spool drive train.

* * * * *